May 18, 1948.　　　　O. E. DEVER　　　　2,441,801
SELF-DRIVEN WHEEL
Filed May 23, 1946　　　　2 Sheets-Sheet 1
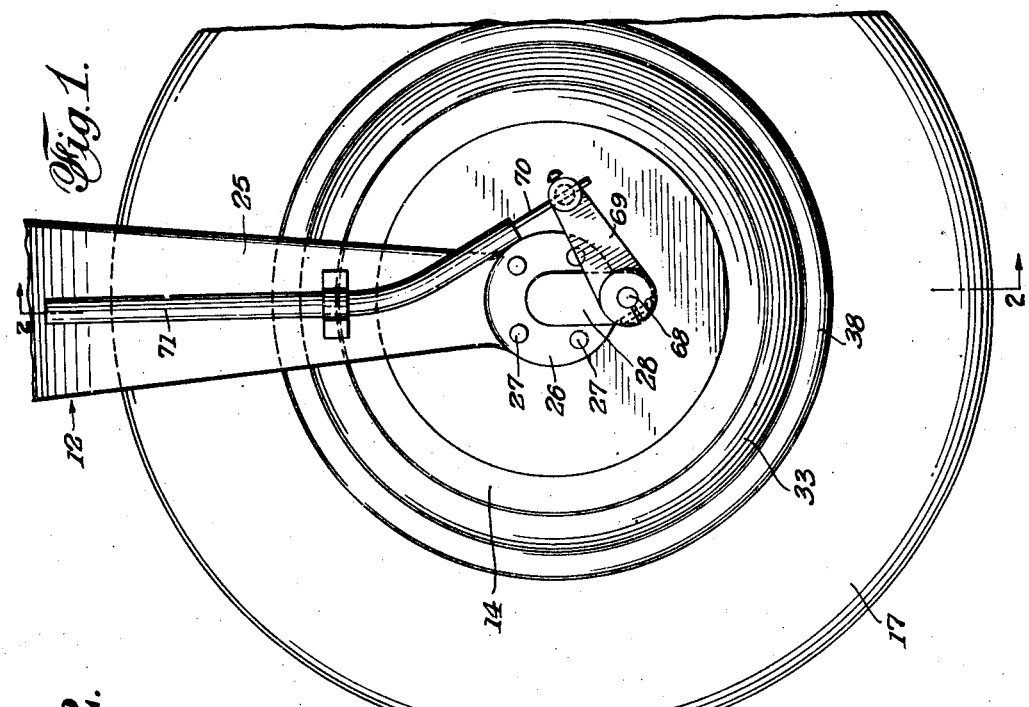
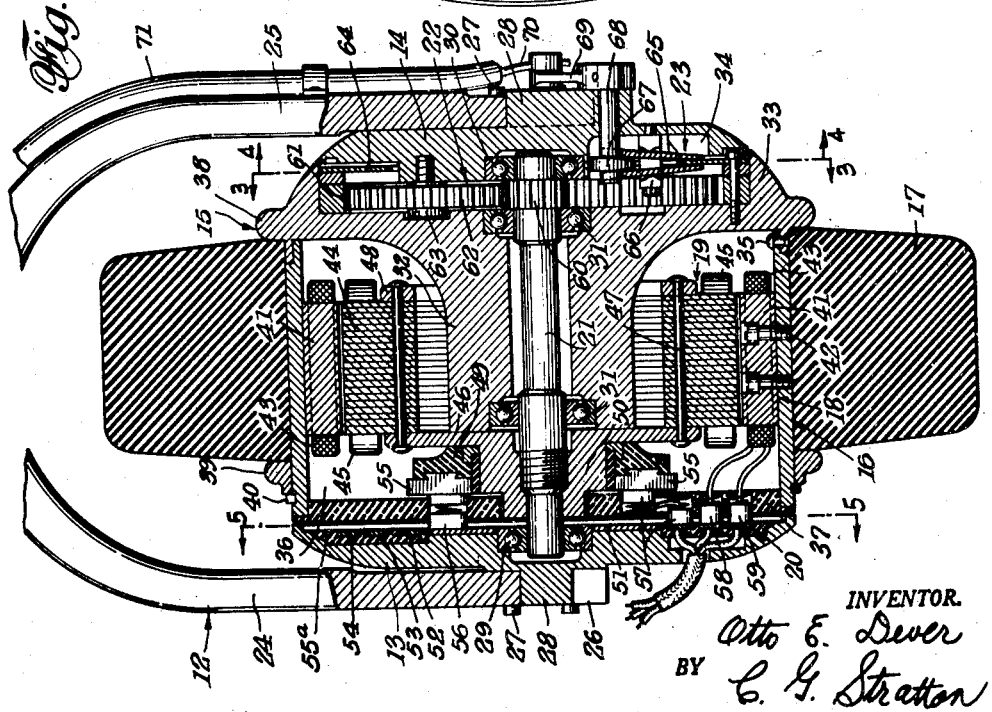
INVENTOR.
Otto E. Dever
BY C. G. Stratton
ATTORNEY May 18, 1948. O. E. DEVER 2,441,801
SELF-DRIVEN WHEEL
Filed May 23, 1946 2 Sheets-Sheet 2
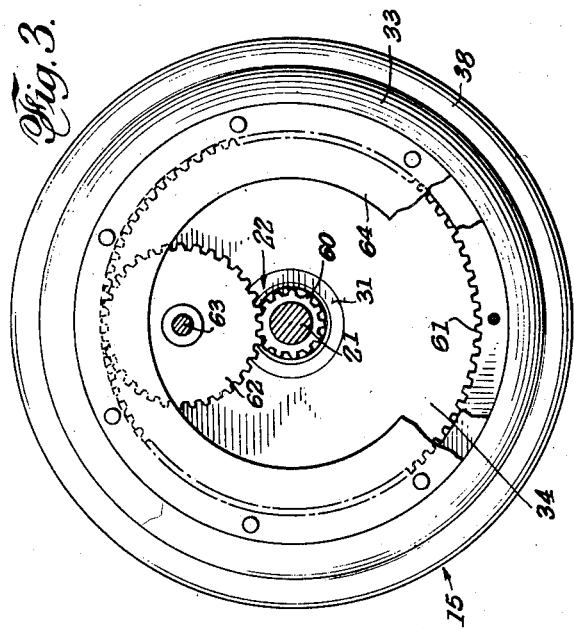
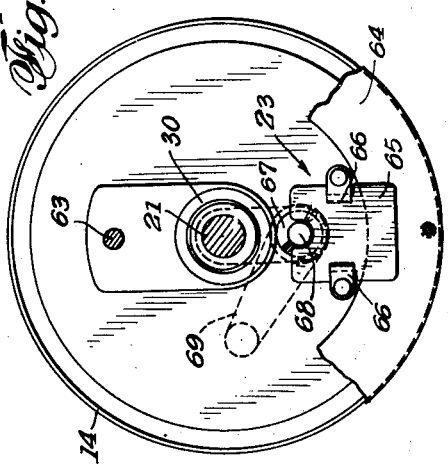
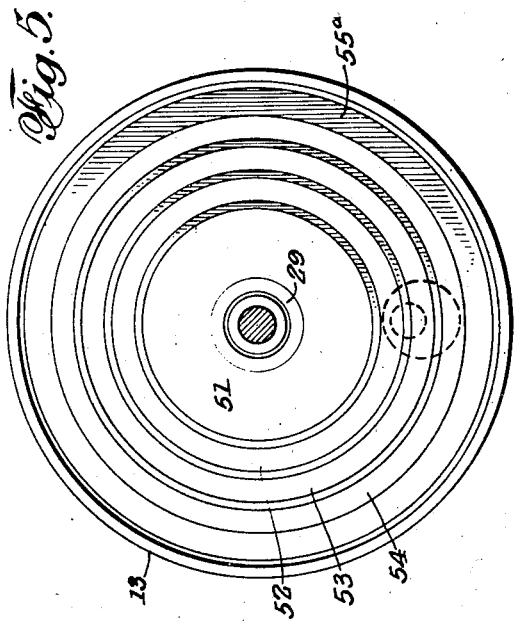
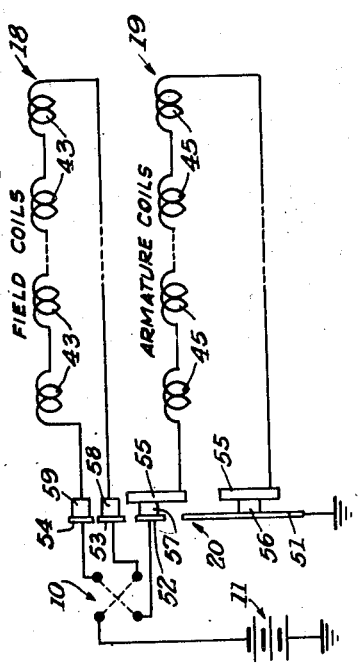
INVENTOR.
Otto E. Dever
BY C. G. Stratton
ATTORNEY Patented May 18, 1948

2,441,801

UNITED STATES PATENT OFFICE 2,441,801

SELF-DRIVEN WHEEL

Otto E. Dever, Burbank, Calif.

Application May 23, 1946, Serial No. 671,761

9 Claims. (Cl. 172—287)

This invention relates to a self-driven wheel construction and deals more particularly with a wheel, incorporating an electric motor, adapted to be rotated by energization thereof.

The main object of the present invention is to provide a motor wheel embodying a reversible motor for obtaining a rotation of the wheel in both directions selectively, and wherein reduction gearing is provided for obtaining relatively slow rotation with respect to the higher speed of rotation of the armature of the motor.

Another object of the invention is to provide a motor wheel as indicated embodying a brake controlling the speed of rotation thereof.

Another object of the invention is to provide a motor wheel embodying novel means, arranged in a novel manner, for connecting a source of electric current to the field and armature coils of a motor structure embodied in the wheel.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view, partly broken, of a wheel construction according to the present invention.

Fig. 2 is a cross-sectional view as taken on the plane of the line 2—2 of Fig. 1.

Figs. 3 and 4 are sectional views as taken on the lines 3—3 and 4—4, respectively, of Fig. 2.

Fig. 5 is a sectional view as taken on the line 5—5 of Fig. 2.

Fig. 6 is a wiring diagram of the motor and the manner of its connection to a source of electric current.

The wheel of the present invention has many uses and applications. The drawings illustrate a wheel more particularly adapted as the front or caster wheel of a wheel chair. Accordingly, the steering handle of such a chair would be provided with the necessary starting switch, with a reversing switch 10, and with a brake operating lever (not shown) so that the chair occupant can readily control the operation of the wheel. A source of electric current such as a battery 11 is provided in a generally conventional manner, one side of the battery being grounded to the chair as shown and the motor, as will be later described, also being grounded for simplification of the electric circuit.

In the particular form of the invention shown, a fork or yoke 12 mounts the wheel which comprises generally, fixed side plates 13 and 14; a rotary member 15 which carries a felly 16 mounting a tire 17; an electric motor which embodies a field 18 carried by the felly, an armature 19, commutator means 20 for effecting electrical connection of the field and armature to the reversing switch 10; a shaft 21 driven by the armature, reduction gearing 22 between the shaft and the member 15 to effect drive of the latter by the motor at reduced speed with respect to the armature; and a brake 23 for controlling the rotation of the wheel.

As shown, the yoke 12 comprises spaced arms 24 and 25 each formed with a notched end 26 and, respectively, secured to the plates 13 and 14 by bolts or screws 27. A projection 28 extends from each plate into the notched ends 26. In this manner, the plates 13 and 14 are fixedly carried by the yoke 12, yet removable therefrom.

The plate 13 comprises a circular disc which carries a portion of the commutator means 20 and is provided at its center with an anti-friction bearing 29. The plate 14 is also circular but somewhat smaller in diameter and is similarly provided with an anti-friction bearing 30. The shaft 21 extends between the plates and is mounted in said bearings 29 and 30.

The member 15 is mounted on the shaft 21 by anti-friction bearings 31 and includes a hub part 32 and an annular flange part 33 associated with the plate 14. Both the plate 14 and the flange part 33, on their adjacent faces, are so formed as to provide an included circular chamber 34 in which the gearing 22 and the brake 23 are disposed. The yoke 12, the plates 13 and 14, and the member 15 may be made of a lightweight material such as aluminum or an alloy thereof for suitable strength yet relatively light weight.

The felly 16 comprises a preferably ferrous tubular member extending from the flange part 33, to which it is secured as by rivets 35, toward, but just clear of, the plate 13 to enclose an annular chamber or space 36 in which the motor is disposed. A dielectric plate 37, parallel to the plate 13 effects closure of the space 36 and thereby seals the motor.

The member 15 is provided with an annular rim 38 adjacent the felly 16 and the felly mounts a ring 39 which confines the tire against the rim 38. A snap ring 40 in a groove in the felly retains the assembly. The tire 17 may be solid, as shown, or pneumatic.

The field 18 of the motor comprises field magnets 41 secured by bolts or screws 42 to the inner surface of the felly and field coils 43 carried by said field magnets.

The armature 19 comprises a preferably laminated annular core magnet 44 through which the hub part 32 of the member 15 extends, and armature coils 45 mounted on said core magnet in a generally conventional manner. Said armature magnet is mounted on a face plate 46 threaddedly connected to the shaft 21 and tie bolts 47 pass through the laminations, through the face plate 46, and through a lock ring 48 to firmly effect assembly of the armature.

The commutator means 20 includes a commutator 49 mounted on a hub 50 of the face plate 46, and a plurality of collector rings 51, 52, 53 and 54 carried by the plate 13. The rings 52, 53 and 54 are mounted on a dielectric insert 55a of the plate 13 so that the latter rings are insulated from the plate 13 and from each other. The ring 51, however, is mounted directly on said plate and is, therefore, electrically grounded thereto, to the fork and to the same ground as the battery 11.

The commutator 49 is formed with commutator segments 55 and one or more grounding brushes 56, carried by the plate 37, electrically bridges the ring 51 and the segments 55, successively.

One or more brushes 57 electrically bridge the ring 52 and said segments 55. The rings 53 and 54 are provided with brushes 58 and 59, respectively to effect electrical connection to opposite sides of the field coils 43. An electric connection is made from each ring 52, 53 and 54 to the reversing switch 10 which, in turn is connected to the battery 11 as shown in the diagram.

With the switch 10 in one position, battery current will pass through the field coils 43 in one direction, then through the armature coils by way of the commutator 49, and to ground by way of the commutator and the brush 56. The armature 19 will be caused to rotate in one direction by the cutting of the lines of flux induced between the magnets 41 and 44. With the switch 10 in the other position, battery current will pass through the field coils 43 in the other direction. The motor circuit will otherwise be the same and the armature will rotate in the other direction with respect to the field 18 of the felly 16. Since the shaft 21 is fixed with the armature, said shaft will be rotated in a direction depending on the position of the reversing switch.

The gearing 22 effects a reduced speed drive of the member 15 and consequently of the felly 16 and tire 17. Said gearing comprises a sun pinion 60 on the shaft 21, an internal ring gear 61 carried by the member 15, and one or more planetary gears 62 mounted on free pivots 63 on the plate 14. The relatively high speed of the pinion 60 will result in reduced speed of the larger gear 62 and still further reduced speed of the internal gear 61.

The brake 23 is used to vary the speed of the wheel as imparted by the gearing 22 and to brake the wheel against rotation after current to the motor is stopped. The brake comprises a brake ring 64 carried by the member 15, a pair of plates or brake shoes 65, members 66 carried by the plate 14 and mounting said plates to form pivots or fulcrums therefor, a cam wedge 67 to spread said plates at one end and thereby cause the other ends of the plates to pinch or grip the opposed faces of brake ring 64, a shaft 68 in the plate 14 on which the cam is mounted and an operating lever 69 on the outer end of said shaft. A control such as a flexible cable 70, connects the lever 69, through a sheath 71, with a manual lever as hereinbefore indicated.

The drawings show the brake in applied condition with the brake shoes 65 pinching the brake ring 64 between them and thereby frictionally locking the rotating portion of the wheel to the fixed plate 14. By depressing the cable 70, the lever 69 is rocked to bring reducingly tapered portions of the cam into active engagement between the brake shoes. The pressure on said brake shoes will, therefore, be eased so that they will release the brake ring 64 and free the wheel for rotation. By varying the push or pull on the cable 70, the normal speed of the wheel can be varied from a maximum to zero speed.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

It is to be understood that permanent magnets may be employed instead of the coils 43 and field magnets 41. This would lengthen the life of a battery that supplies current to the present self-driven wheel. Moreover, it would be a modification of the present invention to employ a pneumatic tire instead of the solid rubber tire 17.

Having thus described my invention, what I claim and desire to secure by Letters Patent is:

1. A wheel structure comprising spaced, fixed members, a relatively rotatable shaft extending between the members, a wheel felly rotatably carried by the shaft between the members, a motor armature carried by the shaft, a motor field carried by the felly, and gear means operatively connecting the shaft and the felly.

2. A wheel structure comprising spaced, fixed members, a relatively rotatable shaft extending between the members, a wheel felly rotatably carried by the shaft between the members, a motor armature carried by the shaft, a motor field carried by the felly, and gear means operatively connecting the shaft and the felly, said gear means comprising a pinion gear on the shaft, an internal gear on the felly, and at least one planetary gear carried by one of the fixed members and in mesh with both the pinion gear and the internal gear.

3. A wheel structure comprising spaced, fixed members, a relatively rotatable shaft extending between the members, a wheel felly rotatably carried by the shaft between the members, a motor armature carried by the shaft, a motor field carried by the felly, a commutator carried by the armature, collector rings carried by one of the fixed members, and brushes carried by the field to bridge between the commutator and collector rings for effecting electric connection of the field and the armature from said fixed member, and gear means operatively connecting the shaft and the felly.

4. A wheel structure comprising spaced, fixed members, a relatively rotatable shaft extending between the members, a wheel felly rotatably carried by the shaft between the members, a motor armature carried by the shaft, a motor field carried by the felly, gear means operatively connecting the shaft and the felly, and a brake, carried by one of the fixed members and by the felly for effecting braking action therebetween.

5. A wheel structure comprising spaced, fixed members, a relatively rotatable shaft extending between the members, a wheel felly rotatably carried by the shaft between the members, a motor armature carried by the shaft, a motor field carried by the felly, gear means operatively connecting the shaft and the felly, and a brake for effecting braking action between one of the fixed members and the felly, said brake comprising a brake ring on the felly, brake shoes associated therewith and pivotally mounted on said fixed member, and cam means for moving said brake shoes into varying friction gripping relation to the brake ring.

6. A wheel structure comprising spaced, fixed members, a relatively rotatable shaft extending between the members, a wheel felly rotatably carried by the shaft between the members, a motor armature carried by the shaft, a motor field carried by the felly, gear means operatively connecting the shaft and the felly, and a brake for effecting braking action between one of the fixed members and the felly, said brake comprising a brake ring on the felly, brake shoes associated therewith and pivotally mounted on said fixed member, and cam means for moving said brake shoes into varying friction gripping relation to the brake ring, the cam means comprising a wedge, a shaft mounted in the fixed member carrying said wedge, and a lever on the shaft adapted to be manually controlled to move the wedge for variable spreading of the brake shoes.

7. In a wheel structure, a pair of spaced, fixed members, a rotatable shaft extending between the members, a motor armature carried by the shaft, a commutator carried by the armature, a wheel felly generally coextensive with the shaft, a motor field including field coils carried by the felly, collector rings carried by one of the fixed members, and electrical contact brushes mounted to move with the felly and slidably engaged with the commutator and the collector rings for conducting electric current through said fixed member to the motor armature and field.

8. In a wheel structure, a pair of spaced, fixed members, a rotatable shaft extending between the members, a motor armature carried by the shaft, a commutator carried by the armature, a wheel felly generally coextensive with the shaft, a motor field including field coils carried by the felly, collector rings carried by one of the fixed members, and electrical contact brushes mounted to move with the felly and slidably engaged with the commutator and the collector rings for conducting electric current through said fixed member to the motor armature and field, said collector rings including a ring electrically grounded to said fixed member, a ring electrically connected through one of said brushes to the commutator, and a pair of rings electrically connected through other of said brushes to opposite sides of the mentioned field coils.

9. In a wheel structure, a pair of spaced, fixed members, a rotatable shaft extending between the members, a motor armature carried by the shaft, a commutator carried by the armature, a wheel felly generally coextensive with the shaft, a motor field including field coils carried by the felly, collector rings carried by one of the fixed members, and electrical contact brushes mounted to move with the felly and slidably engaged with the commutator and the collector rings for conducting electric current through said fixed member to the motor armature and field, said collector rings including a ring electrically grounded to said fixed member, a ring electrically connected through one of said brushes to the commutator, and a pair of rings electrically connected through other of said brushes to opposite sides of the mentioned field coils, the three latter rings being insulated from said fixed member and from each other.

OTTO E. DEVER.

REFERENCES CITED

The following references are of record in the file of this patent:

UNITED STATES PATENTS

| Number | Name | Date |
| --- | --- | --- |
| 1,011,778 | Harshorn | Dec. 12, 1911 |
| 1,270,421 | Kingsbury | June 25, 1918 |
| 1,577,304 | Schurch | Mar. 16, 1926 |